A. T. HALLOCK.
BOTTOM FOR HAMMOCKS.
APPLICATION FILED JAN. 11, 1910.

979,158.

Patented Dec. 20, 1910.

Witnesses
H. O. Van Antwerp
Minnie Johnson

Inventor
Arthur T. Hallock
By Luther V. Moulton
Attorney

THE NORRIS PETERS CO., WASHINGTON, D. C.

UNITED STATES PATENT OFFICE.

ARTHUR T. HALLOCK, OF GRAND RAPIDS, MICHIGAN, ASSIGNOR, BY MESNE ASSIGNMENTS, TO ANNE LAY HALLOCK, OF MUSKEGON, MICHIGAN.

BOTTOM FOR HAMMOCKS.

979,158.

Specification of Letters Patent. Patented Dec. 20, 1910.

Application filed January 11, 1910. Serial No. 537,430.

*To all whom it may concern:*

Be it known that I, ARTHUR T. HALLOCK, a citizen of the United States of America, residing at Grand Rapids, in the county of Kent and State of Michigan, have invented certain new and useful Improvements in Bottoms for Hammocks; and I do hereby declare the following to be a full, clear, and exact description of the invention, such as will enable others skilled in the art to which it appertains to make and use the same.

Figure 1:
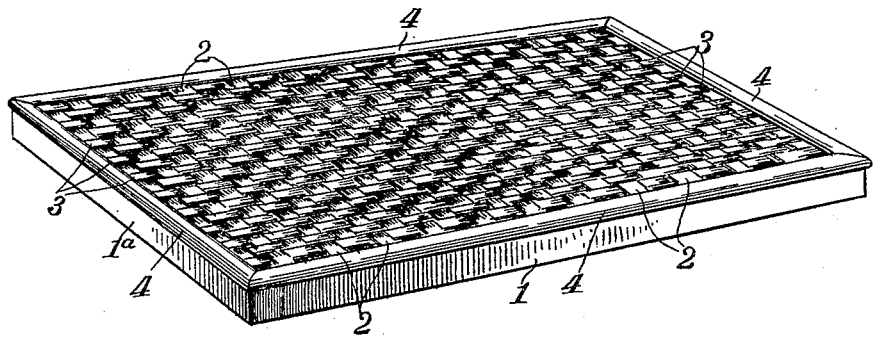
Figure 3:
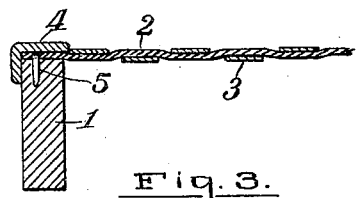
Figure 4:
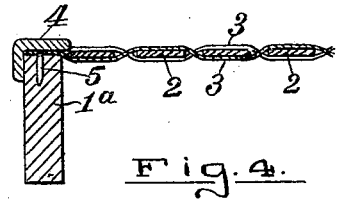
Figure 2:
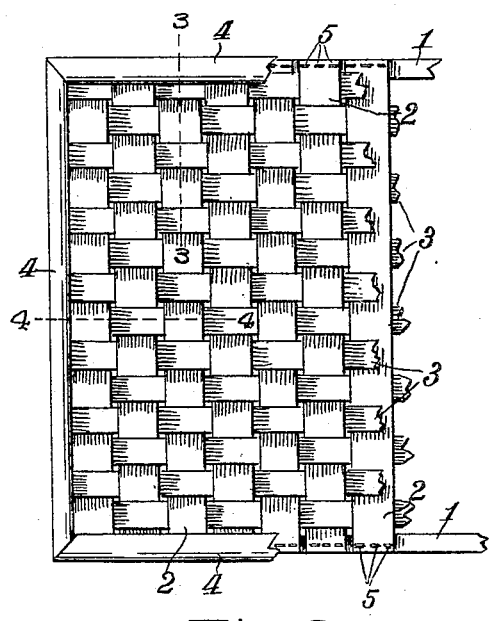
Figure 5:
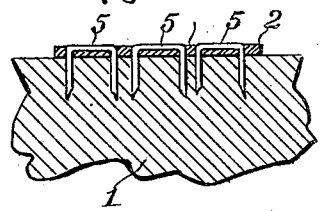

My invention relates to improvements in bottoms for hammocks, beds, chairs, and other like structures, and its object is to provide the same with various new and useful features, hereinafter more fully described and particularly pointed out in the claims, reference being had to the accompanying drawings, in which:

Figure 1 is a perspective of a device embodying my invention; Fig. 2 a plan view of a portion of the same broken away to show the construction; Fig. 3 a vertical section on the line 3—3 of Fig. 2; Fig. 4 the same on the line 4—4 of Fig. 4; and, Fig. 5 a detail in vertical section through the fastening staples and a portion of one of the side rails.

Like numbers refer to like parts in all of the figures.

1 represents the side rails, and 1ª the end rails of a frame of suitable dimensions for the purpose required, that shown being adapted for a hammock or bed bottom.

2 represents thin transverse strips, preferably of hard wood, interwoven with which are longitudinal strips 3 of like material, the transverse strips being wider and thicker than the longitudinal strips and adapted to take the principal part of the strain of the load. These strips are secured to the side and end rails by fastenings consisting of rectangular staples 5 arranged transversely of the ends of the strips and driven down into the same sufficient to partially or wholly embed their connecting members therein, whereby the strips are securely fastened to the rails. The ends of the strips and the upper outer angle of the rails are covered with a finishing molding 4 rabbeted to fit above the ends of the strips and extend downward on the outer surface of the rails a short distance, whereby the strips are still further secured in place, and a neat, smooth finish formed that prevents any contact with or exposure of the ends of the strips.

What I claim is:—

1. A bottom for hammocks, beds, chairs, and the like, comprising a frame, interwoven longitudinal and transverse strips, the transverse strips being thicker and stronger than the longitudinal strips and adapted to carry the principal part of the load, and means for securing the said strips to the frame.

2. A bottom for hammocks, beds, chairs, and the like, comprising a frame, interwoven longitudinal and transverse strips, the transverse strips being wider and stronger than the longitudinal strips and adapted to carry the principal part of the load, and means for securing said strips to the frame.

3. A bottom for hammocks, beds, chairs, and the like, comprising a frame, interwoven longitudinal and transverse strips, the transverse strips being wider and thicker than the longitudinal strips, rectangular staples having their connecting members embedded in the ends of the strips and their ends driven into the frame, and a rabbeted finishing strip covering the ends of the bottom strips and the fastenings and extending upon the outer face of the frame.

In testimony whereof I affix my signature in presence of two witnesses.

ARTHUR T. HALLOCK.

Witnesses:
GEORGIANA CHACE,
MINNIE JOHNSON.